United States Patent

Chao

[11] Patent Number: 4,743,191
[45] Date of Patent: May 10, 1988

[54] MULTI-PIECE DIE FOR FORMING HONEYCOMB STRUCTURES

[75] Inventor: Tai-Hsiang Chao, Mount Prospect, Ill.

[73] Assignee: Allied-Signal Inc., Morristown, N.J.

[21] Appl. No.: 33,274

[22] Filed: Apr. 2, 1987

[51] Int. Cl.[4] .............................................. B29C 47/00
[52] U.S. Cl. ................................ 425/190; 264/177.12; 425/192 R; 425/461; 425/466; 425/467
[58] Field of Search ............ 264/176.1, 177.1, 177.11, 264/177.12, 209.8; 425/109, 192 R, 192 S, 197, 198, 199, 380, 382 R, 461–467

[56] References Cited

U.S. PATENT DOCUMENTS

| | | | |
|---|---|---|---|
| 1,152,978 | 9/1915 | Royle | 425/192 |
| 2,908,037 | 10/1959 | Harkenrider | 425/199 |
| 3,038,201 | 6/1962 | Harkenrider | 425/197 |
| 3,559,252 | 2/1971 | Schmidt et al. | 425/192 |
| 3,778,217 | 12/1973 | Bustamante et al. | 425/467 |
| 3,790,654 | 2/1974 | Bagley | 264/177 |
| 3,824,196 | 7/1974 | Benbow et al. | 252/455 R |
| 3,905,743 | 9/1975 | Bagley | 425/464 |
| 3,923,444 | 12/1975 | Esper et al. | 425/461 |
| 3,983,283 | 9/1976 | Bagley | 264/177.12 |
| 4,298,328 | 11/1981 | Frost | 425/461 |
| 4,343,604 | 8/1982 | Minjolle | 425/192 R |
| 4,468,366 | 8/1984 | Socha, Jr. | 425/461 |
| 4,550,005 | 10/1985 | Kato | 264/177 |

*Primary Examiner*—Jeffery Thurlow
*Assistant Examiner*—J. Fortenberry

*Attorney, Agent, or Firm*—Thomas K. McBride; John F. Spears, Jr.; John G. Tolomei

[57] ABSTRACT

A multipiece die for extruding honeycomb structures that facilitates a variation of geometries in the formation of honeycomb structures by reducing the amount of machining necessary to change die configurations for different honeycomb arrangements. The die has at least two sets of channel forming pins which are supported from separate die bodies. The channel forming pins when brought together with the separate die bodies define a series of discharge slots by which the extrudable structure is ejected from the die. A plurality of cavities communicate extrudable material from inlet and outlet sides of each die body. The cavities in downstream die bodies, downstream being taken with respect to the flow of extrudable material, are made with sufficient size to allow pins depending from upstream die bodies through the cavities while still allowing enough open area to provide a feed passage for the extrudable material. The die bodies can be secured with ordinary fasteners to maintain relative spacing between the pins and the desired geometry of the discharge slots. Manufacturing the die in multiple pieces allows geometry parameters of the die to be easily varied with at most only partial manufacturing of new die components. Geometric features such as slot width, relative pin depth, and alternate pin geometries are examples of the types of modifications that are facilitated by this die design.

8 Claims, 3 Drawing Sheets

MULTI-PIECE DIE FOR FORMING HONEYCOMB STRUCTURES

BACKGROUND OF THE INVENTION

1. Field of the Invention

This invention relates generally to honeycomb structures formed of ceramic materials. More specifically, this invention relates to the forming of ceramic materials into thin wall honeycomb structures by extrusion.

2. Description of the Prior Art

The term honeycomb structures is used generally to describe a thin walled body having a series of regularly or irregularly shaped parallel channels that extend continuously over the length of the body and are separated by wall elements that give the body its structure. The cross-section of each channel may vary from channel to channel but usually will have a regular geometric shape. These honeycomb structures find use in regenerators, heat exchange equipment, filters, and as catalyst carriers. The use of such carriers is also well known in the treatment of automotive exhaust gases where the carriers are typically treated with a wash coat of catalytic material.

Ceramic honeycoabs have been formed by extrusion methods with fairly good success. The extrusion method uses a hydraulic ram to push the extrudable material into a series of feed passages which communicate with a discharge area. The discharge area has a series of projections, that displace the extrudable material from the sections that will eventually correspond to the channels of the extrusion, and define a series of gaps which shape the extrudable material into the walls of the honeycomb structure. It has become common practice to extrude honeycombs having channel densities of from 100 to 200 channels per square inch upon extrusion, and 200 to 400 channels per square inch after shrinkage of the extrudable material during curing. Typically, the wall thicknesses between the channels of the honeycomb structure will vary between 0.002 inches and 0.050 inches.

Methods and apparatus for forming extruded honeycomb structures are further described in U.S. Pat. Nos. 3,790,654, 3,905,743, 3,824,196, and 4,550,005. U.S. Pat. Nos. 3,905,743 and 3,790,654 issued to Bagley describe a method for forming a thin walled honeycomb extrusion that uses a die having feed passages and intersecting feed slots. Bagley claims and primarily teaches aligning the feed passages to communicate directly with the interconnections or intersections between a series of orthogonal slots. U.S. Pat. No. 3,824,196 issued to Benbow et al., describes a method of making a thick walled honeycomb structure by passing a plastic material through a die having a series of feed passages that again intersect and communicate directly with intersecting points in a series of orthogonal slots that define the shape of the extrusion. Benbow also teaches that the feed passages should have a greater cross-sectional area than the transverse cross-sectional area of the discharge slots in order to provide sufficient material for filling the discharge slots. U.S. Pat. No. 4,550,005 issued to Kato teaches a method of extruding a honeycomb structure having walls of varied thickness and a die for use therein. The die and the method of Kato use feed passages having a hydraulic diameter that varies in relation to the walled portion being formed thereby. The feed passages are varied such that feed passageways associated with a thin walled portion have a relatively large hydraulic diameter, and feed passageways associated with thick wall portions have a relatively small hydraulic diameter.

All of these prior art forming methods have used one-piece dies to extrude the honeycomb structures. These one-piece dies are known to provide, with varying degrees of success, a single extrusion geometry. However, if any feature of the extrusion geometry is changed, an entirely new die must be fabricated. These dies require relatively expensive fabrication techniques to provide the fine discharge slot dimension, on the order of 1/40 inch and smaller, and the pin dimensions of 0.075 inch or less. Therefore, it would be advantageous to have the ability to vary the arrangement of a die for forming honeycomb monoliths without remanufacturing an entirely new die-plate assembly.

SUMMARY OF THE INVENTION

Accordingly, an arrangement has been discovered for fabricating a die, used to form honeycomb structures, in two or more pieces so that a number of geometric parameters can be varied with only a partial refabrication of the die. The die arrangement of this invention allows pin dimensions, discharge slot widths, relative pin depths, and pin geometries to be varied by changing component pieces of a die assembly.

The die consists of at least two sets of channel forming pins. Each set of channel forming pins is arranged in a spaced relationship to define, with the pins of the other pin sets, a series of discharge slots. The discharge slots provide an outlet through which the extrudable structure of the die is formed. A separate die body holds each set of the channel forming pins. Each die body is superimposable above the other die body and has a series of cavities for communicating the outlet side of the body, from which the pins depend, with the inlet side of the die body.

Accordingly, it is an object of this invention to provide an improved method and die for producing extruded honeycomb structures.

It is another object of this invention to increase the versatility of dies for forming honeycomb structures.

It is also an object of this invention to simplify the manufacture of dies for forming honeycomb structures.

It is a further object of this invention to provide a multipiece die for extruding honeycomb structures.

Therefore, in one aspect this invention comprises a die for forming multichannel extrudable structures where the die has at least two sets of independently supported channel forming pins. The pins in each pin set are arranged in a spaced relationship to define, with the pins of the other pin sets a series of discharge slots through which an extrudable structure can be discharged from the die. A separate die body supports each set of channel forming pins. Each die body is arranged in upstream to downstream order with respect to the flow of the extrudable material and has an outlet side from which channel forming pins depend and an inlet side located opposite the outlet side. A plurality of feed cavities communicate the inlet and outlet sides of each die body in an overlapping relationship that provides a straight flow path between the inlet side of each die body and the discharge slots formed by the pins. Means may also be located on the die bodies for maintaining a predetermined spacing between the pins of each die body.

As the foregoing description suggests, the totality of pins that define the discharge slots may be supported from two, or three, or more die bodies. The pins supported from each die body may be arranged in a regular or irregular pattern. The only limitations on the arrangement of the pins and the geometry of the die bodies are that they can be assembled in a top to bottom fashion such that the series of cavities in the die plates located below an upper die plate allow projection of the pin through the outlet side of the lowermost die body with the cavities still having sufficient open area for the passage of extrudable material through the die bodies for discharge out of the lowermost die.

In a more specific form, the die of this invention consists of a top and bottom die plate. Pins in both plates are arranged in a regular grid pattern of alternating cavities and pins. The grid pattern of the lower die plate is reversed relative to the upper die plate such that pins supported by the upper die plate pass through cavities in the lower die plate and are surrounded by pins of the lower die plate to form the discharge slots of the die. There is no limitation on the shape of the pins that can be used in either the two-piece die or the more generalized die concept of this invention. Regardless of their shape the pins are supported across the open area of the die body by short webs that connect adjacent pins and border the cavities.

A number of benefits, as previously mentioned, can be obtained by the multipiece construction of this die. First, it is possible by the use of appropriate spacers between the die bodies to vary the relative depth of the pins supported by different die plates in order to vary the geometry of the walls that are formed during the extrusion of a honeycomb structure. In this manner, variations in the wall geometry of the honeycomb structure can be obtained without any remanufacturing of the die. By manufacturing one or more additional die bodies in which some element of the pin geometry is altered, it is also possible to change the geometry of a honeycomb structure manufactured from a given die by only changing one or more of the die body elements. For example, in the previously described 2-piece die configuration, reducing the relative width of the pins in one die body will increase the width of the discharge slots and the resulting width of the channel walls in an extruded honeycomb structure. In addition, in the same 2-piece die, alternate square and circular channel openings may be obtained by substituting one of the die plates having rectangular pins with another die plate having circular pins.

Those skilled of the art are aware of many other variations and combinations that may be achieved by the interchanging of different die bodies and modification of the relative spacing between the die bodies. A detailed description of this invention is provided in the context of a die having two die body components. The presentation of the detailed description in this format is not meant to limit the invention to the details disclosed therein.

DETAILED DESCRIPTION OF THE PREFERRED EMBODIMENT

Figure 1:
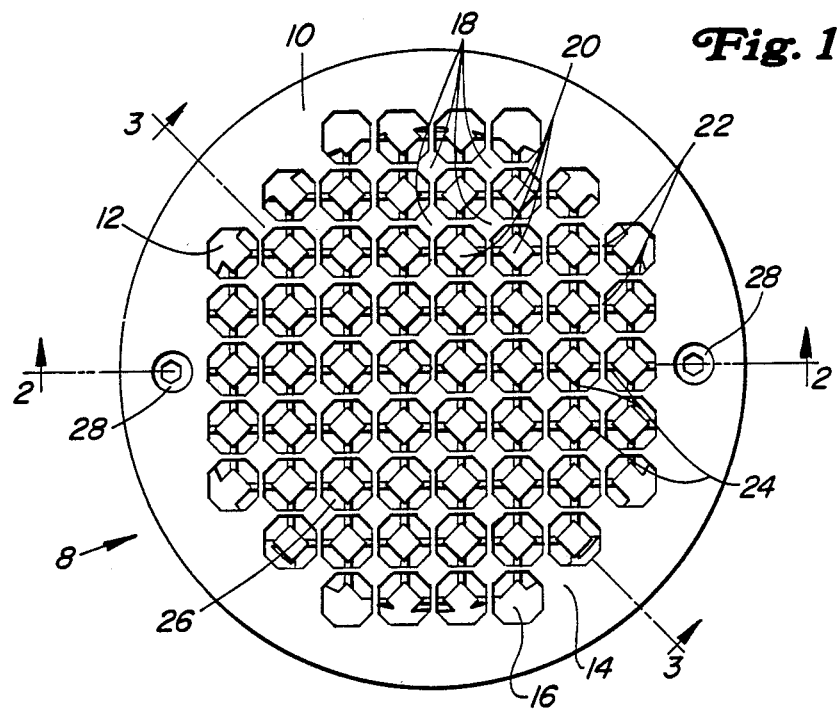
FIG. 1 is a plan view showing the inlet side, or top, of a die of this invention.

Referring then to FIG. 1, this view depicts an extrusion die 8 having an upper die body 10 and a lower die body 12. The top faces of upper die bodies 10 and 12 present inlet surfaces 14 and 16, respectively. A series of channel forming pins 18 are arranged in a rectangular grid work across the inlet face of die body 10. A similar rid work of pins 20 is arranged across the face of the lower die body 2. Pins 18 and 20 are in a relative offset pattern such that each pin in one set has a projection through the middle of pin group of another set. A series of orthogonally arranged webs 22 and 24 for the upper and lower pin sets, respectively, join the pins in each pin set and support the pins from their associated die body. These webs must be designed to provide adequate support to the pins under the pressure imposed by the flow of extrudable material.

Extrudable material passes through the upper die body by flowing through the octagonal openings defined by the lateral faces of adjacent pins and their connecting webs. Although the lower die body has the same octagonal shaped openings, its openings are partially filled by the pins of the upper die body. The remaining open space through the lower die define a series of feed passages 26 having an irregular hexagon shape. Feed passages 26 communicate extrudable material from the inlet surface 14 of the upper die body 10 to the discharge area of the die located below webs 24. For purposes of illustration, the pins are shown in reduced size relative to the feed passages, in normal practice the feed passages are usually much narrower in width. A set of cap screws 28 provide the means for maintaining the relative spacing between the channel pins by securing the two die bodies together.

Figure 2:
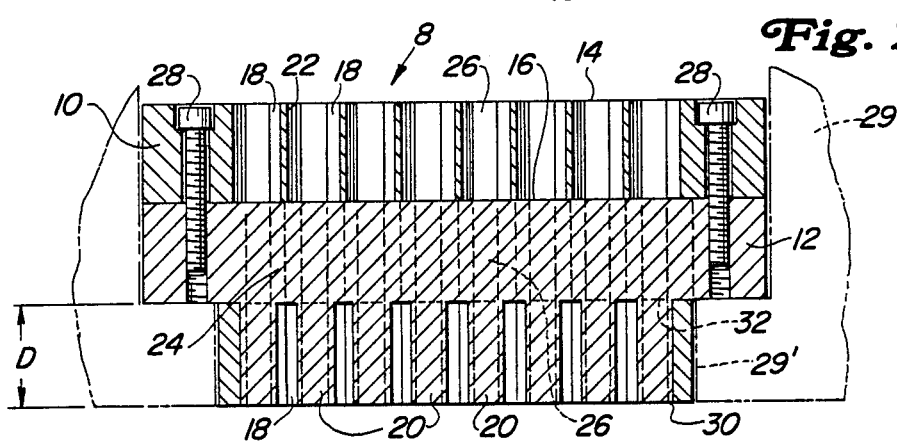
FIG. 2 shows a section of the die taken across line 2—2 of FIG. 1.

FIG. 2 shows the arrangement of the cap screws in a cross-section of the die taken parallel to and across the middle row of lower die body webs 24. Cap screws 28 extend through upper die body 10 and are threaded into the lower die body 12 to secure the two die bodies together. When in use the entire die body 8 rests in the jaws 29 of a hydraulic press that forces extrudable material against inlet surface 14. The tops of pins 18 and webs 22 extend up to inlet surface 14. Pins 18 also extend downward past inlet surface 16 of lower die body 12 and down to the outlet end 30 of the discharge zone, the discharge zone being that portion of the die extending below the lower line 32 of lower die body 12 up to outlet end 30. Webs 22 of the upper die body also extend downward from inlet surface 14 but only to inlet surface 16 of the lower die body. Pins 20 of the lower die body extend from inlet surface 16 to the outlet end 30 of the discharge zone. FIG. 2 shows both sets of pins 18 and 20 ending at outlet end 30, however, as previously mentioned in order to vary wall geometry of the extruded structure, some or all of the pins in either pin set may extend to different levels. Feed passages 26 communicate the extrudable mixture from inlet face 14, across die bodies 10 and 12, and past lower line 32 into discharge zone D.

Figure 3:
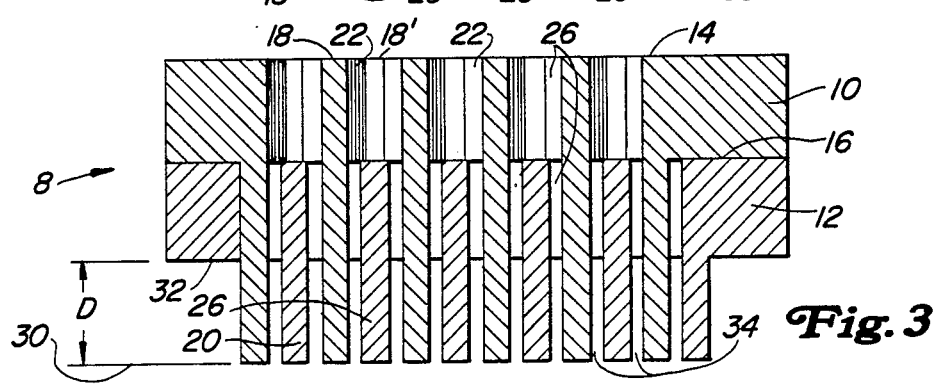
FIG. 3 shows a section of the die taken across line 3—3 of FIG. 1.

The configuration and relative relationship of the feed passages and pin sets are shown more clearly in FIG. 3 which is a cross-section of the die body taken parallel to the faces of the pins. The continuous length of pins 18 cut by section line 3—3 is shown from inlet surface 14 to outlet end 30. Webs 22 diagonally bridge the space between the sectioned pins 18 and the next row of upper die body pins 18' which are located behind the sectioned pins. The view of pins 18' below inlet surface 16 is blocked by pins 20 of the lower die body which again extend from inlet surface 16 to outlet end 30. Again feed passages 26 consist of the large octagonal openings in the upper die body defined by pins 18 and webs 22, and the directly subadjacent area below inlet surface 16 which remains open after insertion of pins 18 through lower die body 12. The lower ends of feed passages 26 communicate with discharge area D which comprises a series of orthogonal slots 34. In order to prevent extrudable material from flowing out of the slots 34, cylindrical face 29' of press jaws 29 blocks the outer circumference of discharge zone D.

Figure 4:
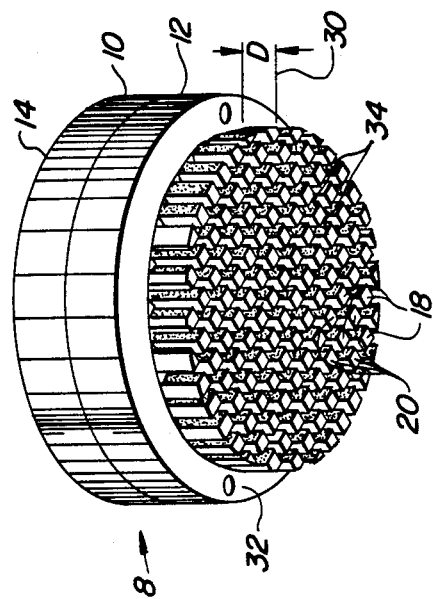
FIG. 4 is an isometric view of the discharge side, or bottom, of the die.

FIG. 4 shows the die in three dimensions and illustrates the configuration of discharge zone D. Orthogonal slots 34 which extend over length D of the discharge zone and are defined by the mutually perpendicular faces of pins 18 and 20. Slots 34 intersect at the ends of the pin faces. The geometry of slots 34 define the cross-section of a monolith that is formed within the discharge zone and ejected through outlet end 32.

Figure 5:
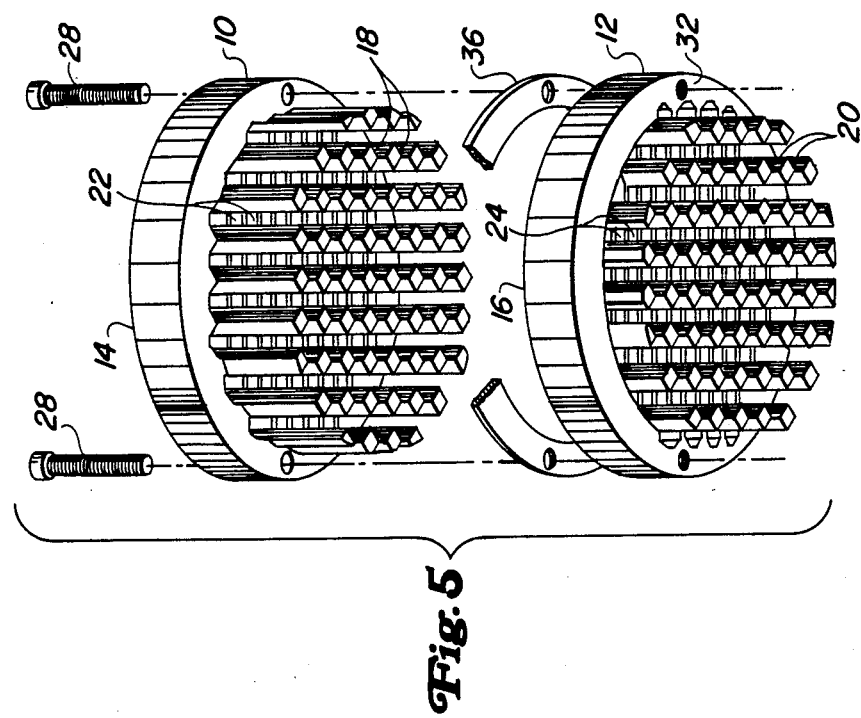
FIG. 5 is an exploded isometric view of the die.

An understanding of the shape of each die body can be obtained from FIG. 5 which shows an exploded view of the die and an optional spacer ring 36 for varying the relative projection of the pins at outlet end 30 of the discharge zone. Spacer ring 36 displaces the entire die body 10 upwardly relative to the lower die body 12. When the die is designed, as shown in FIG. 4, such that the lower ends of pins 18 and 20 are normally at the same elevation when the two die bodies are held together, addition of spacer ring 36 will displace upper die body pins 18 to obtain a desired degree of pin elevation difference. Addition of spacer 36 will not interfere with the operation of the feed passages since the entire center section of the spacer is left open.

In regard to the ability of the feed passages to inject extrudable material into discharge slots 34, the web and pin design of the 2-piece die complements this function. The open area of the feed passages that communicate directly with the orthogonal slots of the discharge zone have a cross-section that substantially matches the cross-section of the non-intersecting portion of the discharge slots. By this arrangement, the extrudable material has the most open communication with sections of the discharge slots that have the minimum hydraulic diameter. Preferentially, feeding the extrudable material to minimum hydraulic diameter sections of the discharge slots assures that these sections of the discharge slots are completely filled to the maximum density thereby improving the structural strength of the final honeycomb structure and maximizing the quality of the wall sections where they are the thinnest and potentially the weakest. Since the thinnest wall sections have the smallest hydraulic diameters and thus the greatest resistance to flow, lateral movement of the extrudable mixtures into adjacent areas of the discharge slots is encouraged as the mixture will seek the path of least resistance. As a result, this arrangement of feed passages may allow the overall length of the die to be reduced since the distance over which flow impedance is necessary for distribution is decreased by the increased lateral movement of the extrudable mixture. Additional information on the location of feed passages to introduce extrudable material to the discharge zone at points of increased flow resistance can be obtained from my copending application having U.S. Ser. No. 946,234.

Figure 6:
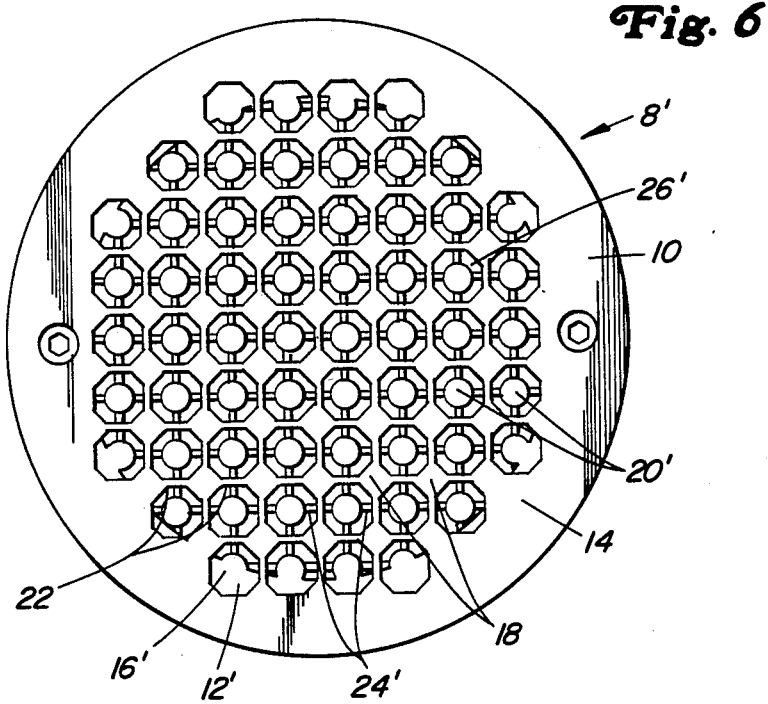
FIG. 6 shows the die of FIG. 1 with a modified component.

As previously stated, any number of cross-sectional shapes are contemplated for the channel forming pins in either of the die bodies. These shapes include circles, squares, triangles, ovals, etc. In addition, the slots of the discharge zone may be arranged to provide any number of geometric patterns such as circular, triangular or, rectangular grid works. In order to show one such variation, FIG. 6 illustrates a die 8'. Die body 10 has the same configuration as previously described, which includes inlet surface 14 and rectangular channel forming pins 18, connected at adjacent corners by the series of webs 22. Die body 8' also has a lower die body 12' with an inlet surface 14' and a set of cylindrical channel forming pins 20' which present circular pin projections through inlet face 14'. Circular channel pins 20' are connected at adjacent sides by a series of webs 24'. A series of feed passages 26' again communicate extrudable material from inlet surface 14 to a discharge zone located below webs 24'. Feed passages 26' are similar to feed passage 26 defined by die 8 and only differ in that the lower portion of the feed passages 26' have an arcuate side along the boundary, defined by cylindrical channel pins 20'. In all other respects, die body 8' will function in substantially the same manner as die body 8 when used to extrude honeycomb structures.

Regardless of form, each die body is preferably made from a solid block of material. The segmented pins and webs may be formed by removing the base material of the die from the solid blocks through appropriate techniques. It has been found that in order to make very fine honeycombs, having 200 channels per inch or more, the necessary tolerance and uniformity can be easily achieved by electric discharge machining. It is also contemplated that laser cutting techniques can be advantageously employed to machine the die.

A variety of materials can be used for forming the die. The only requirements are that the material can be formed or machined into the shape of the desired die and will have sufficient strength to withstand the pressure exerted on the die during the extrusion process. A preferred material for the die is cold rolled steel. An advantage of employing burning methods, such as electric discharge machining or laser cutting techniques, to machine the die from cold rolled steel, is that the die stock may be hardened prior to the machining process.

EXAMPLE

In order to obtain honeycomb structures using the die of this invention as shown in FIGS. 1-4, having the configuration depicted in FIGS. 1-5 was manufactured. The die has an overall diameter of approximately 1⅝ inches and an overall thickness of approximately ¾ inch. The discharge portion of the die was machined to approximately 1 3/16 inch diameter to provide a 3/16 inch shoulder about the circumference of the die. Electric discharge machining was employed to form square pins approximately 0.075 inch in diameter in each die body such that when the die was assembled the slots of the discharge zone had a width of approximately 1/40 of an inch. This pattern yields a channel density of 100 openings per square inch. The thickness of the die was divided about evenly into the first die body, second die body, and discharge zone such that each section has a total depth of approximately ¼ inch.

An extrudable material comprising 43 parts of kaolin clay, 39 parts of talc powder, 18 parts of alumina, 31 parts of water and 4 parts of methocel as lubricant were mixed by a paddle mixer to provide an extrudable mixture. This mixture was introduced into the cylinder of an extrusion apparatus containing the previously described die. A hydraulic piston produced a pressure of about 2,000 psi on the extrudable mixture which forced the mixture through the die at a rate of approximately 30 inches per minute. An extrusion recovered from the bottom of the apparatus was found to have well-formed walls with a thickness of about 0.025 inches between the channel openings. The overall honeycomb structure had approximately 100 openings per square inch. The ceramic honeycomb structure was then dried and fired to approximately 1435° C. which reduced the thickness of the channel walls to approximately 0.020 inches and increased the number of channels to approximately 160 openings per square inch.

What is claimed is:

1. A multi-piece die for forming multi-channeled extrudable structures having at least 100 channels per square inch from extrudable material said die comprising:
   (a) a first die body having a first inlet face, a first outlet face, and an integrally formed first set of channel forming pins and webs interconnecting said channel forming pins, said channel forming pins having a uniform spacing between all of said pins over said first outlet face and a length extending from said inlet face past said outlet face, said webs providing the only attachment to said channel forming pins and said channel forming pins and webs defining a first regular pattern of cavities through said die body;
   (b) a second die body superimposed in part above said first die body having a second inlet face, a second outlet face adjacent said first inlet face, and an integrally formed second set of channel forming pins and interconnecting webs, the pins in said second set having the same spacing as the pins in said first set and a length extending from said second inlet face through said cavities past said second outlet face, the webs in said second set providing the only attachment to the pins in said second set, and the pins and webs of said second set defining a second regular pattern of cavities through said second die body; and
   (c) means for securing said first die body to said second die body such that said first and second cavities provide linear flow passages for passing said extrudable material through said die.

2. The die of claim 1 wherein said means for securing comprises a set of fasteners for clamping the die bodies together.

3. The die of claim 1 wherein means are provided for varying the spacing between the die bodies and thereby varying th extension of the pins in said second set past said first outlet face.

4. The die of claim 3 wherein said means for varying spacing comprises a spacer ring clamped between the die bodies.

5. The die of claim 1 wherein all of the pins have the same shape.

6. The die of claim 1 wherein the pins in said first and second sets of pins and webs are rectangular in cross-section.

7. The die of claim 6 wherein the pins in said first and second sets of pins and webs have uniform rectangular cross-sections and are connected at adjacent corners.

8. The die of claim 1 wherein the pins in one of said sets of pins and webs have a rectangular cross-section and the pins in the other of said sets of pins and webs have a circular cross-section.

* * * * *